United States Patent [19]

Levy et al.

[11] Patent Number: 5,853,859
[45] Date of Patent: Dec. 29, 1998

[54] ROOM TEMPERATURE LATEX PRINTING

[75] Inventors: Ruth Lisa Levy, Sugar Hill; Robert Emil Weber, Marietta, both of Ga.

[73] Assignee: Kimberly-Clark Worldwide, Inc., Neenah, Wis.

[21] Appl. No.: 499,802

[22] Filed: Jul. 7, 1995

[51] Int. Cl.$^6$ .............................. B05D 5/06; B32B 3/00
[52] U.S. Cl. .................. 428/196; 428/206; 428/207; 442/63; 442/152; 442/170
[58] Field of Search ................................. 428/196, 282, 428/206, 207, 240, 244; 442/63, 164, 152, 170

[56] References Cited

U.S. PATENT DOCUMENTS

| | | | |
|---|---|---|---|
| 3,261,796 | 7/1966 | Simms | 260/29.6 |
| 3,338,992 | 8/1967 | Kinney | 264/24 |
| 3,341,394 | 9/1967 | Kinney | 161/72 |
| 3,502,763 | 3/1970 | Hartmann | 264/210 |
| 3,542,615 | 11/1970 | Dobo et al. | 156/181 |
| 3,692,618 | 9/1972 | Dorschner et al. | 161/72 |
| 3,802,817 | 4/1974 | Matsuki et al. | 425/66 |
| 3,855,046 | 12/1974 | Hansen et al. | 161/150 |
| 4,041,203 | 8/1977 | Brock et al. | 428/157 |
| 4,340,563 | 7/1982 | Appel et al. | 264/518 |
| 4,457,980 | 7/1984 | Daniels et al. | 428/196 |
| 4,507,342 | 3/1985 | Kielbania, Jr. | 428/90 |
| 4,663,220 | 5/1987 | Wisneski et al. | 428/221 |
| 5,087,646 | 2/1992 | Tork et al. | 523/406 |
| 5,108,820 | 4/1992 | Kaneko et al. | 428/198 |
| 5,108,827 | 4/1992 | Gessner | 428/219 |
| 5,169,706 | 12/1992 | Collier, IV et al. | 428/152 |
| 5,169,888 | 12/1992 | Sales | 524/267 |
| 5,284,703 | 2/1994 | Everhart | 428/283 |
| 5,336,552 | 8/1994 | Strack et al. | 428/224 |
| 5,370,132 | 12/1994 | Weber et al. | 128/849 |
| 5,382,400 | 1/1995 | Pike et al. | 264/168 |

FOREIGN PATENT DOCUMENTS

| | | | |
|---|---|---|---|
| 0 062 338 | 10/1982 | European Pat. Off. | D21H 1/28 |
| 0 105 598 | 4/1984 | European Pat. Off. | D06P 5/00 |
| 377434 | 7/1990 | European Pat. Off. . | |
| 61-055274 | 3/1986 | Japan | D06P 1/44 |
| 62-231787 | 10/1987 | Japan | B41M 5/00 |
| 060019391 | 1/1994 | Japan . | |
| 6-212081 | 8/1994 | Japan | C08L 101/02 |

OTHER PUBLICATIONS

"Polymer Blends And Composites" by J. A. Manson et al., copr. 1976, pp. 273 through 277.

*Primary Examiner*—Marion E. McCamish
*Assistant Examiner*—Elizabeth M. Cole
*Attorney, Agent, or Firm*—James B. Robinson; Douglas H. Tulley, Jr.

[57] ABSTRACT

A fabric substrate comprising thermoplastic polyolefin fibers is printed with a printing composition comprising a room temperature curable latex polymer, a pigment and a cure promoter, which retains a colorfastness above 3 when exposed to liquids with a pH between about 2 and about 13. The mixture may be applied to the fabric as an aqueous mixture with a pre-cure pH adjusted to above 8 using a fugitive alkali and then cured at room temperature.

24 Claims, No Drawings

ROOM TEMPERATURE LATEX PRINTING

BACKGROUND OF THE INVENTION

Fabrics in general are used for a wide variety of applications from wipers and diapers to automobile covers. These applications call for materials having diverse properties and attributes. Some applications call for fabrics which are highly wettable, e.g. liners for diapers and feminine hygiene products, and which are soft, or are absorbent like wipers and towels, while others require strength, e.g. protective fabrics like car and boat covers, and still others require repellency and barrier properties like medically oriented fabrics for, for example, sterilization wraps and surgical gowns. Though the myriad applications for fabrics may seem unrelated and diverse, a common feature for many fabrics is the desire to have them printed in some manner. This printing may be for the purpose of advertisement, product identification, decoration, obscuring stains, etc. Unfortunately, because of the conditions under which many fabrics are used, completely successful printing systems have not been developed, most particularly printing systems which may be carried out at room temperature. In the case of wipers, for instance wipers for food service applications, the chemicals used for cleaning have been found to remove the printing from wipers printed previously.

It is therefore an object of this invention to provide a printing composition which is easy to apply, cures at room temperature, and which will remain on the fabric when exposed to most common cleaning chemicals and under most conditions of use. It is another objective of this invention to provide a nonwoven fabric which is printed with the printing composition provided. It is yet another objective of this invention to provide a printed food service wiper which will retain its color under typical use conditions.

SUMMARY

There is herein provided a composition for printing comprising an aqueous mixture having a room temperature curable latex polymer, a pigment, and a cure promoter, which when printed onto a substrate and dried, results in printing which retains a colorfastness to crocking above 3 when exposed to liquids with a pH between about 2 and about 13. The mixture may also contain a viscosity modifier. The mixture may be applied to a fabric as an aqueous mixture with a pre-cure pH adjusted to above 8 using a fugitive alkali and then cured at room temperature.

Also provided is a printed substrate which may be a fabric of hydroentangled pulp and spunbond fibers, spunbond fabrics, meltblown fabrics, woven fabrics and laminates of spunbond and meltblown fabrics and having thereon the dried residue of the aqueous mixture described above and which retains a colorfastness to crocking above 3 when exposed to liquids with a pH between about 2 and about 13.

DEFINITIONS

As used herein the term "nonwoven fabric or web" means a web having a structure of individual fibers or threads which are interlaid, but not in an identifiable manner as in a knitted fabric. Nonwoven fabrics or webs have been formed from many processes such as for example, meltblowing processes, spunbonding processes, and bonded carded web processes. The basis weight of nonwoven fabrics is usually expressed in ounces of material per square yard (osy) or grams per square meter (gsm) and the fiber diameters useful are usually expressed in microns. (Note that to convert from osy to gsm, multiply osy by 33.91). As used herein the term "microfibers" means small diameter fibers having an average diameter not greater than about 75 microns, for example, having an average diameter of from about 0.5 microns to about 50 microns, or more particularly, microfibers may have an average diameter of from about 2 microns to about 40 microns. Another frequently used expression of fiber diameter is denier, which is defined as grams per 9000 meters of a fiber. For example, the diameter of a polypropylene fiber given in microns may be converted to denier by squaring, and multiplying the result by 0.00629, thus, a 15 micron polypropylene fiber has a denier of about 1.42 ($15^2 \times 0.00629 = 1.415$).

As used herein the term "spunbonded fibers" refers to small diameter fibers which are formed by extruding molten thermoplastic material as filaments from a plurality of fine, usually circular capillaries of a spinneret with the diameter of the extruded filaments then being rapidly reduced as by, for example, in U.S. Pat. No. 4,340,563 to Appel et al., and U.S. Pat. No. 3,692,618 to Dorschner et al., U.S. Pat. No. 3,802,817 to Matsuki et al., U.S. Pat. Nos. 3,338,992 and 3,341,394 to Kinney, U.S. Pat. No. 3,502,763 to Hartman, U.S. Pat. No. 3,502,538 to Levy, and U.S. Pat. No. 3,542,615 to Dobo et al. Spunbond fibers are generally not tacky when they are deposited onto a collecting surface. Spunbond fibers are generally continuous and often have diameters larger than 7 microns, more particularly, between about 10 and 20 microns.

As used herein the term "meltblown fibers" means fibers formed by extruding a molten thermoplastic material through a plurality of fine, usually circular, die capillaries as molten threads or filaments into converging high velocity gas (e.g. air) streams which attenuate the filaments of molten thermoplastic material to reduce their diameter, which may be to microfiber diameter. Thereafter, the meltblown fibers are carried by the high velocity gas stream and are deposited on a collecting surface to form a web of randomly disbursed meltblown fibers. Such a process is disclosed, for example, in U.S. Pat. No. 3,849,241. Meltblown fibers are microfibers which may be continuous or discontinuous, are generally smaller than 10 microns in diameter, and are generally tacky when deposited onto a collecting surface.

As used herein the term "polymer" generally includes but is not limited to, homopolymers, copolymers, such as for example, block, graft, random and alternating copolymers, terpolymers, etc. and blends and modifications thereof. Furthermore, unless otherwise specifically limited, the term "polymer" shall include all possible geometrical configuration of the material. These configurations include, but are not limited to isotactic, syndiotactic and random symmetries.

As used herein the term "monocomponent" fiber refers to a fiber formed from one or more extruders using only one polymer. This is not meant to exclude fibers formed from one polymer to which small amounts of additives have been added for coloration, anti-static properties, lubrication, hydrophilicity, etc. These additives, e.g. titanium dioxide for coloration, are generally present in an amount less than 5 weight percent and more typically about 2 weight percent.

As used herein the term "conjugate fibers" refers to fibers which have been formed from at least two polymers extruded from separate extruders but spun together to form one fiber. Conjugate fibers are also sometimes referred to as multicomponent or bicomponent fibers. The polymers are usually different from each other though conjugate fibers may be monocomponent fibers. The polymers are arranged in substantially constantly positioned distinct zones across the cross-section of the conjugate fibers and extend continuously along the length of the conjugate fibers. The configuration of such a conjugate fiber may be, for example, a sheath/core arrangement wherein one polymer is surrounded by another or may be a side by side arrangement or an "islands-in-the-sea" arrangement. Conjugate fibers are taught in U.S. Pat. No. 5,108,820 to Kaneko et al., U.S. Pat. No. 5,336,552 to Strack et al., and U.S. Pat. No. 5,382,400 to Pike et al. For two component fibers, the polymers may be present in ratios of 75/25, 50/50, 25/75 or any other desired ratios.

As used herein the term "biconstituent fibers" refers to fibers which have been formed from at least two polymers extruded from the same extruder as a blend. The term "blend" is defined below. Biconstituent fibers do not have the various polymer components arranged in relatively constantly positioned distinct zones across the cross-sectional area of the fiber and the various polymers are usually not continuous along the entire length of the fiber, instead usually forming fibrils or protofibrils which start and end at random. Biconstituent fibers are sometimes also referred to as multiconstituent fibers. Fibers of this general type are discussed in, for example, U.S. Pat. No. 5,108,827 to Gessner. Conjugate and biconstituent fibers are also discussed in the textbook *Polymer Blends and Composites* by John A. Manson and Leslie H. Sperling, copyright 1976 by Plenum Press, a division of Plenum Publishing Corporation of New York, IBSN 0-306-30831-2, at pages 273 through 277.

As used herein the term "blend" means a mixture of two or more polymers while the term "alloy" means a sub-class of blends wherein the components are immiscible but have been compatibilized. "Miscibility" and "immiscibility" are defined as blends having negative and positive values, respectively, for the free energy of mixing. Further, "compatibilization" is defined as the process of modifying the interfacial properties of an immiscible polymer blend in order to make an alloy.

As used herein, through air bonding or "TAB" means a process of bonding a nonwoven conjugate fiber web which is wound at least partially around a perforated roller or through an oven which is enclosed in a hood. Air which is sufficiently hot to melt one of the polymers of which the fibers of the web are made is forced from the hood, through the web and into the perforated roller. The air velocity is between 100 and 500 feet per minute and the dwell time may be as long as 6 seconds. The melting and resolidification of the polymer provides the bonding. Through air bonding has restricted variability and is generally regarded a second step bonding process. Since TAB requires the melting of at least one component to accomplish bonding, it is generally restricted to conjugate webs though it may be used with adhesive fibers or webs also.

As used herein "thermal point bonding" involves passing a fabric or web of fibers to be bonded between a heated calender roll and an anvil roll. The calender roll is usually, though not always, patterned in some way so that the entire fabric is not bonded across its entire surface. As a result, various patterns for calender rolls have been developed for functional as well as aesthetic reasons. One example of a pattern has points and is the Hansen Pennings or "H&P" pattern with about a 30% bond area with about 200 bonds/square inch as taught in U.S. Pat. No. 3,855,046 to Hansen and Pennings. The H&P pattern has square point or pin bonding areas wherein each pin has a side dimension of 0.038 inches (0.965 mm), a spacing of 0.070 inches (1.778 mm) between pins, and a depth of bonding of 0.023 inches (0.584 mm). The resulting pattern has a bonded area of about 29.5%. Another typical point bonding pattern is the expanded Hansen and Pennings or "EHP" bond pattern which produces a 15% bond area with a square pin having a side dimension of 0.037 inches (0.94 mm), a pin spacing of 0.097 inches (2.464 mm) and a depth of 0.039 inches (0.991 mm). Another typical point bonding pattern designated "714" has square pin bonding areas wherein each pin has a side dimension of 0.023 inches, a spacing of 0.062 inches (1.575 mm) between pins, and a depth of bonding of 0.033 inches (0.838 mm). The resulting pattern has a bonded area of about 15%. Yet another common pattern is the C-Star pattern which has a bond area of about 16.9%. The C-Star pattern has a cross-directional bar or "corduroy" design interrupted by shooting stars. Other common patterns include a diamond pattern with repeating and slightly offset diamonds and a wire weave pattern looking as the name suggests, e.g. like a window screen. Typically, the percent bonding area varies from around 10% to around 30% of the area of the fabric laminate web. As is well known in the art, the spot bonding holds the laminate layers together as well as imparts integrity to each individual layer by bonding filaments and/or fibers within each layer.

As used herein, the term "machine direction" or MD means the length of a fabric in the direction in which it is produced, i.e., the direction of travel of the forming wire onto which spunbond and meltblown fabrics are typically formed. The term "cross machine direction" or CD means the width of fabric, i.e. a direction generally perpendicular to the MD.

As used herein, the term "garment" means any type of non-medically oriented apparel which may be worn. This includes industrial work wear and coveralls, undergarments, pants, shirts, jackets, gloves, socks, and the like.

As used herein, the term "infection control product" means medically oriented items such as surgical gowns and drapes, face masks, head coverings like bouffant caps, surgical caps and hoods, footwear like shoe coverings, boot covers and slippers, wound dressings, bandages, sterilization wraps, medical wipers, garments like lab coats, coveralls, aprons and jackets, patient bedding, stretcher and bassinet sheets, and the like.

As used herein, the term "personal care product" means baby wipers, diapers, training pants, absorbent underpants, adult incontinence products, and feminine hygiene products.

As used herein, the term "outdoor fabric" means a fabric which is primarily, though not exclusively, used outdoors. Outdoor fabric includes fabric used in protective covers, camper/trailer fabric, tarpaulins, awnings, canopies, tents, agricultural fabrics and outdoor apparel such as head coverings, industrial workwear and coveralls, pants, shirts, jackets, gloves, socks, shoe coverings, and the like.

As used herein, the term "protective cover" means a cover for vehicles such as cars, trucks, boats, airplanes, motorcycles, bicycles, golf carts, etc., covers for equipment often left outdoors like grills, yard and garden equipment (mowers, roto-tillers, etc.) and lawn furniture, as well as floor coverings, table cloths and picnic area covers.

As used herein, the term "marine fabric" means fabric which may be used in a service which is primarily on boats or otherwise in proximity to water, such as curtains for boats, boat covers, boat seat material and seat cover material, bimini top material, covers for various boat equipment, e.g. crank covers, sail covers, engine covers and steering wheel covers, sails, and other marine applications.

As used herein, the term "food service wiper" means a wiper used primarily in the food service industry, i.e., restaurants, cafeterias, bars, catering, etc. but which may be used in the home as well. Food service wipers may be made from woven and\or nonwoven fabrics. These wipers are usually used to wipe up food spills on countertops, chairs, etc., and in cleanup of grease, oil, etc., from splatters or spills in the cooking or serving areas, with a variety of cleaning solutions. Cleaning solutions typically used in food service area clean up can vary widely in pH from highly acidic to highly alkaline and may be solvent solutions as well.

TEST METHODS

Colorfastness to crocking: Colorfastness to crocking is measured by placing a 5 inch by 7 inch (127 mm by 178 mm) piece of the material to be tested into a Crockmeter model cm-1 available from the Atlas Electric Drive., Chicago, of 4114 Ravenswood Ave., Chicago, Ill. 60613. The crockmeter strokes or rubs a cotton cloth back and forth across the sample a predetermined number of times (in the tests herein the number was 30) with a fixed amount of force. The color transferred from the sample onto the cotton is then compared to a scale wherein 5 indicates no color on the cotton and 1 indicates a large amount of color on the cotton. A higher number indicates a relatively more colorfast sample. The comparison scale is available from the American Association of Textile Chemists and Colorists (AATCC), P.O. Box 12215, Research Triangle Park, N.C. 27709. This test is similar to the AATCC Test Method 8 except the AATCC test procedure uses only 10 strokes across the cloth and uses a different sample size. The inventors believe their 30 stroke method is more rigorous than the AATCC 10 stroke method.

DETAILED DESCRIPTION OF THE INVENTION

The food service industry is an immense enterprise serving millions of meals on a daily basis. Those millions of meals require varying degrees of preparation ranging from merely opening a container to the preparation of a multi-course feast. One characteristic shared by all of the millions of diversely prepared meals served each day, however, is the need to eventually dispose of the leftovers and clean up the food preparation area, the utensils, pots and pans used in preparation, and wipe up the eating area.

In the past this clean up has been done using woven fabrics such as towels, which may be laundered and reused a number of times. Laundering is, of course, an added expense which also necessitates collection and storage of the dirty towels and storage of the returned clean towels and also creates the possibility of towel pilferage. Storage of such materials invites unwanted insect and rodent diners as well as tying up a portion of the real estate of the enterprise in a non-income producing activity.

Disposable wipers are also used in the food service industry and have the benefit of requiring less storage space and reducing the amount of nuisance-attracting food waste present. The lack of a need to launder disposable wipers and the accompanying advantages to their use cited above have led to their successful penetration into the food service industry on a large scale. It has been desired to produce a wiper with a logo, e.g. a restaurant name, or one which has printing which will hide food stains on the wiper. Past experiments with such printing have not been successful because of the relatively harsh environment in which the wipers are used.

Wipers in the food service industry are often used with harsh cleaners such as bleach (e.g., sodium hypochlorite), acid-based soaps or commercial mixtures such as The Clorox Company's Formula 409® "all purpose" cleaner which contains water, detergents, and the grease cutter 2-butoxyethanol (an alcohol). Cleaning solutions also often contain sanitizing chemicals. Such chemicals have been found quite effective in removing the print from printed substrates.

The inventors have found that an aqueous composition containing at least a room temperature curable latex polymer, a crosslinker or cure promoter, and pigment, when applied to a substrate and dried, provides a printing composition which remains surprisingly colorfast even after exposure to many common cleaning chemicals. This composition may be applied to virtually any substrate, though particularly woven fabrics like towels, and nonwoven fabrics, and will provide a durably printed object. Such a composition may be applied by any method known in the art to be successful but particularly by flexographic and gravure printing.

The amounts of the ingredients of the printing composition may be, based on for example, an amount of latex composition of about 100 parts by dry weight, for the pigment, from about 0.5 to about 33 parts by dry weight, and for the crosslinker, from about 1 to about 10 parts by dry weight. More particularly, the desired range for the ingredients based on about 100 parts of latex composition, is from about 1 to about 5 parts by dry weight for the pigment, and from about 4 to about 6 parts by dry weight for the crosslinker. More pigment and cure promoter could be used, but to little if any effect and at increased cost. The final viscosity of the composition may be adjusted with water and/or viscosity modifier to provide the proper viscosity for the desired method of printing. One applied to a substrate and dried, the remaining dried residue of the aqueous mixture provides the colorfast printing.

Samples were prepared in order to prove the efficacy of the instant invention with a varying amounts of pigment, crosslinker, and latex as shown in Table 1.

The fabric onto which the composition was printed in the samples was in the form of 43 inch (1105 mm) wide rolls which were cut into 5 inch by 7 inch (127 mm by 178 mm) samples for testing and which had a pre-printing bone-dry or moisture free basis weight of 96 gsm for the blue examples and 64 gsm for all others. The fabric had a pulp content of about 80 weight percent and the balance of the fabric was spunbond fibers made from polypropylene. The fabric used in the tests is described in U.S. Pat. No. 5,284,703 (the '703 patent) to Everhart et al., assigned to the same assignee as this invention, one embodiment of which is known commercially as Hydroknit® material. The '703 patent describes a material which is a high pulp content nonwoven composite fabric. The composite fabric contains more than about 70 weight percent pulp fibers which are hydraulically entangled into a continuous filament substrate. The continuous filaments may be spunbond fibers.

There is no constraint on the basis weight or components of the fabric used in the practice of this invention; therefore, other fabrics may be used in the practice of this invention such as a bonded carded webs, woven fabrics, spunbond fabrics or meltblown fabrics and the fabrics may also be made from conjugate or biconstituent fibers. Such fabrics may be a single layer embodiment or as a component of a multilayer laminate which may be formed by a number of different laminating techniques including but not limited to using adhesive, needle punching, thermal point bonding, through air bonding and any other method known in the art. The basis weight may be for example, in the range of from about 49 to about 103 gsm or more particularly from about 64 to about 96 gsm on a pre-printed bone-dry basis.

Multilayer laminates may, for example, be an embodiment wherein some of the layers are spunbond and some meltblown such as a spunbond/meltblown/spunbond (SMS) laminate as disclosed in U.S. Pat. No. 4,041,203 to Brock et al. and U.S. Pat. No. 5,169,706 to Collier, et al or a SFS (spunbond/film/spunbond) construction. An SMS laminate may be made by sequentially depositing onto a moving forming belt first a spunbond fabric layer, then a meltblown fabric layer and last another spunbond layer and then bonding the laminate in a manner described above. Alternatively, the fabric layers may be made individually, collected in rolls, and combined in a separate bonding step. The fabric of this invention may also be laminated with, glass fibers, staple fibers, paper, and other web materials. Multiple meltblown, spunbond, film or other layers may of course be used.

It is also possible to use elastomeric thermoplastic polymers in the production of nonwoven fabrics or webs. Elastomeric thermoplastic polymers may be those made from styrenic block copolymers, polyurethanes, polyamides, copolyesters, ethylene vinyl acetates (EVA) and the like. Generally, any suitable elastomeric fiber or film forming resins or blends containing the same may be utilized to form the nonwoven webs of elastomeric fibers. Commercial examples of such elastomeric copolymers are, for example, those known as KRATON® materials which are available from Shell Chemical Company of Houston, Tex. KRATON® block copolymers are available in several different formulations, a number of which are identified in U.S. Pat. No. 4,663,220, hereby incorporated by reference.

Other exemplary elastomeric materials which may be used to form an elastomeric layer include polyurethane elastomeric materials such as, for example, those available under the trademark ESTANE® from B.F. Goodrich & Co., polyamide elastomeric materials such as, for example, those available under the trademark PEBAX® from the Rilsan Company, and polyester elastomeric materials such as, for example, those available under the trade designation HYTREL® from E.I. DuPont De Nemours & Company.

The printing method may be any which is known in the art to be effective. The preferred method is flexographic printing. In gravure, flexographic and screen printing equipment, the printing composition is transferred to a printing transfer surface which contains the printed patterns and then from the transfer surface the printing composition is transferred directly to the substrate. In flexographic printing it is easy to change the graphics and the printing plates are less expensive than some of the other equipment.

Rotogravure printing uses a print roll which is engraved, therefore greatly increasing the life of the print pattern. Because of the engraving of the roll, it is also possible to get higher definition with respect to the printed pattern or graphics imparted to the substrate. Furthermore, rotogravure equipment generally can be run higher speeds than most of the other equipment and is suitable for use with water-based, solvent-based and hot-melt, adhesive-based printing compositions.

In comparison, screen printing equipment is relatively costly and only one color can be used per screen. Screen printing is used primarily for water-based and hot-melt based printing compositions and it should be noted that the equipment cannot be run as fast as, for example, flexographic printing equipment.

Ink jet printing equipment generally requires printing compositions that have a very low viscosity, often in the range of 1 to 10 centipoise in order to achieve appropriate processing and application and therefore may not be usable with the printing composition of this invention. Some water-based printing compositions can be brought into this range and, furthermore, water-based printing compositions can be used in combination with the ink jet printing equipment. An additional advantage of ink jet printing equipment is the relatively high speed at which it can be run. If the viscosity or particle size of the printing composition of this invention is such that ink jet printing cannot be used, spray printing is an acceptable alternative. Spray printing generally uses nozzles with larger orifices than ink jet printing.

In the samples, a cure promoter was added to a latex base in order to allow curing of the composition at ambient temperatures, well below that which would melt the polymer of a nonwoven web which generally includes a polyolefin like polypropylene. The curing process is triggered by the loss of a fugitive alkali which was also part of the formulation. Alternatively, latex polymers with internal curing agents may be used.

A viscosity modifier or additional water may also be part of the formulation if the viscosity is not in the proper range for printing after the addition of all ingredients.

An acceptable latex polymer system for use in this invention must be crosslinkable at room temperature or at slightly elevated temperatures and must be stable to ambient weather conditions and be flexible when cured. Examples include polymers of ethylene vinyl acetates, ethylene vinyl chlorides, styrene-butadiene, acrylates, and styrene-acrylate copolymers. Such latex polymers generally have a Tg in the range of $-15°$ to $+20°$ C. One such suitable latex polymer composition is known as HYCAR® 26084 from the B.F. Goodrich Company of Cleveland, Ohio. Other suitable latexes include HYCAR® 2671, 26445, 26322 and 26469 from B.F. Goodrich, RHOPLEX® B-15, HA-8 and NW-1715 from Rohm & Haas, DUR-O-SET® Bridgewater, N.J. and BUTOFAN® 4261 and STYRONAL® 4574 from BASF of Chattanooga, Tenn.

An acceptable pigment for use in this invention must be compatible with the latex and crosslinker used. A pigment is specified as pigments refer to compositions having particulate color bodies, not liquid as in a dye. Dyes are believed by the inventors to be unacceptable in the practice of this invention as it is believed they would not be as colorfast as pigments. Commercially available pigments for use in this invention include those manufactured by the Sandoz Chemical Company of Charlotte, N.C., under the trade designation GRAPHTOL®. Particular pigments include GRAPHTOL® 1175-2 (red), GRAPHTOL® 6825-2 (blue), GRAPHTOL® 5869-2 (green), and GRAPHTOL 4534-2 (yellow) and these were used in the examples of Tables 1 and 2. Combinations of these pigments may be used to provide various other colors.

In addition to or perhaps in place of some pigment, a filler such as clay may be used as an extender. The clay appears to have an effect of reducing the colorfastness of the composition and will not provide the color of a pigment of course, but it represents a cost saving measure as it is less expensive than pigments. A clay which may be used is, for example, Ultrawhite 90, available from the Englehard Corp., 101 Wood Ave, Iselin, N.J. 08830.

An acceptable cure promoter for use in this invention must cause or result in the crosslinking of the latex polymer in the composition. Acceptable cure promoters allow the latex based composition to cure at room temperature or slightly above so that the nonwoven web does not need to be heated to a temperature at which it may begin to melt in order to cure the latex. The preferred cure promoter becomes active at a pH which is neutral or acidic, therefore the composition must be kept at a pH of above 8 during mixing and application. The pre-cure pH is kept above 8 by the use of a fugitive alkali such as, for example, ammonia. Fugitive alkalis remain in solution until driven off by drying at room temperature or alternatively, heating them a small amount to increase the evaporation rate. In any case the curing temperature must be at a temperature below the fabric's melting temperature. The loss of the alkali causes a drop in the pH of the composition which triggers the action of the cure promoter.

Suitable cure promoters are for example, XAMA®-2 and XAMA®-7 and are available commercially from the B.F. Goodrich Company of Cleveland, Ohio. Another acceptable cure promoter is Chemitite PZ-33 available from the Nippon parts latex means 300 dry parts latex, and at 50 percents total solids, this would mean 600 wet parts latex.

The aqueous composition was prepared by adding the indicated amount of latex as an aqueous mixture with a fugitive alkali, in this case ammonia, to a pH of about 9. The indicated amount of pigment was then added and the pH rechecked and adjusted if necessary. Lastly, the cure promoter was added and the viscosity was checked and adjusted with viscosity modifier if necessary, to a final pre-cure viscosity as shown.

The viscosity or each composition was tested using a Shell cup number 4. The viscosity is measured in seconds required for the cup to empty by the liquid dripping through a number 4 hole at ambient conditions. Table 1 shows the viscosity in seconds.

TABLE 1

| Color | T.S. | Red | Red | Red | Blue | Green | Red | Red | Blue | Blue | Red | Blue | Green | Pizza |
|---|---|---|---|---|---|---|---|---|---|---|---|---|---|---|
| Pigment | | | | | | | | | | | | | | |
| Red | 20 | 5 | 5 | 5 | 0 | 0 | 5 | 5 | 0 | 0 | 5 | 0 | 0 | 2 |
| Blue | 20 | 0 | 0 | 0 | 15 | 0 | 0 | 0 | 5 | 5 | 0 | 5 | 0 | 0 |
| Green | 20 | 0 | 0 | 0 | 0 | 10 | 0 | 0 | 0 | 0 | 0 | 0 | 5 | 0 |
| Yellow | 20 | 0 | 0 | 0 | 0 | 0 | 0 | 0 | 0 | 0 | 0 | 0 | 0 | 3 |
| Clay | 100 | 95 | 95 | 45 | 45 | 45 | 0 | 0 | 0 | 0 | 0 | 0 | 0 | 0 |
| Latex | | | | | | | | | | | | | | |
| HYCAR 26322 | 50 | 300 | 300 | 300 | 300 | 300 | 300 | 0 | 300 | 0 | 0 | 0 | 0 | 0 |
| HYCAR 26064 | 50 | 0 | 0 | 0 | 0 | 0 | 0 | 300 | 0 | 300 | 0 | 0 | 0 | 0 |
| HYCAR 26445 | 50 | 0 | 0 | 0 | 0 | 0 | 0 | 0 | 0 | 0 | 300 | 300 | 300 | 300 |
| Crosslinker XAMA-7 | 100 | 15 | 0 | 15 | 15 | 15 | 15 | 15 | 15 | 15 | 15 | 15 | 15 | 15 |
| Viscosity | | 43 | 43 | 20 | 15 | 30 | 20 | 20 | 9 | 30 | 15 | 11 | 15 | 10 |

Shokubai Co. of Osaka, Japan. These materials are aziridine oligimers with at least two aziridine functional groups.

A viscosity modifier, though generally not necessary in the practice of this invention, may be used, for example, if the viscosity of the printing composition is not suitable for the method of printing desired. An optional viscosity modifier for increasing viscosity for use in this invention must have thickening properties with Newtonian flow characteristics. One such suitable viscosity modifier is known as ACRYSOL® (RM-8 and is available from the Rohm & Haas Company of Philadelphia, Pa. If it is desired to reduce the viscosity of the printing composition of this invention, water may simply be added to the mixture. The ability to add water is one indication of the ease of use and flexibility of this invention as viscosity control in solvent based systems is considerably more complicated.

The ingredients used by the inventors in the examples are commercially available in aqueous solutions having a total solids percentage amount as indicated in Table 1 in the column labeled "T.S.", therefore requiring little or no additional water. However, the amounts listed in Table 1 for each sample are listed as parts by dry weight of each ingredient. Therefore, for example, the first red example having 300

The compositions of Table 1 were printed onto both sides of Hydroknit® material using the flexographic printing technique and dried at room temperature. The pattern used in printing applied about 3.5 gsm of composition to each side with about 20 percent print coverage. Different patterns would of course give different coverages and basis weight add-ons and would be chosen according to the final use of the fabric, the desired pattern and other factors based on each specific case.

Samples were prepared by cutting a piece of appropriately sized printed fabric. The samples were then dipped into the subject solutions and allowed to remain in the solution for 5 minutes. Each sample was then removed from the solution and placed in the crockmeter while still wet and tested according to the test procedure. The solutions in which the printed fabrics were measured for colorfastness are shown on the left hand of Table 2 and include a dry sample, i.e., no solution, a typical acid based soap having a pH of about 4, a vinegar solution of 5 percent acidity and a pH of 1.9, Clorox's Formula 409 at a concentration of 100 percent having a pH of about 13, 5.25 percent sodium hypochlorite bleach having a pH of about 12, and 70 percent rubbing alcohol (isopropanol).

TABLE 2

| CROCK FASTNESS | Color | | | | | | | | | | | | |
|---|---|---|---|---|---|---|---|---|---|---|---|---|---|
| | Red | Red | Red | Blue | Green | Red | Red | Blue | Blue | Red | Blue | Green | Pizza |
| Pulp | | | | | | | | | | | | | |
| Dry | 4.5 | 4 | 5 | 4 | 4 | 3.8 | 5 | 4 | 4 | 3.7 | 4 | 4.7 | 5 |
| Soap | 4 | 3 | 3 | 1 | 4 | 4 | 4 | 4 | 4 | 4 | 4 | 5 | 5 |
| Vinegar | 3.8 | 3 | 4 | 2.2 | 4 | 4 | 4 | 4 | 4 | 4.3 | 4 | 5 | 5 |
| 409 Solvent | 2.8 | 2 | 3.5 | 1 | 2.5 | 4 | 3 | 3.8 | 4 | 4 | 3.3 | 4.3 | 4.3 |
| Bleach | | | | | | | | | | 3 | 3 | 3 | 4 |
| Rubbing Alcohol | | | | | | | | | | 4 | 3.3 | 4 | 5 |
| Spunbond | | | | | | | | | | | | | |
| Dry | 4 | 4 | 4 | 3 | 3.3 | 3 | 4 | 3.8 | 4 | 3 | 4 | 4.7 | 4 |
| Soap | 4 | 3 | 4 | 1 | 4 | 4 | 4 | 4 | 4 | 4 | 4 | 5 | 5 |
| Vinegar | 3.7 | 2.8 | 3.2 | 2.3 | 3.7 | 4 | 4 | 4 | 4 | 5 | 4.7 | 5 | 5 |
| 409 Solvent | 3 | 2.3 | 3.7 | 1 | 3.3 | 4 | 4 | 4 | 4 | 4 | 3.7 | 4.3 | 5 |
| Bleach | | | | | | | | | | 4 | 4 | 3.3 | 4 |
| Rubbing Alcohol | | | | | | | | | | 4 | 3 | 4 | 5 |
| Total: | 29.8 | 24.1 | 30.4 | 15.5 | 28.8 | 30.8 | 32 | 31.6 | 32 | 47 | 45 | 52.3 | 56.3 |

Thus it can be seen from the above table that substrates printed with the composition of this invention will retain their coloration very well over a wide range of pH and after exposure to solvents and bleach. It should be noted that exposure to sodium hypochlorite bleach has a stronger effect on most items then the mere pH would indicate since it is also a strong oxidating agent. Resistance to bleach therefore is an important attribute since it indicates pH and oxidating agent resistance. The inventors believe the printing composition of this invention will remain essentially unaffected over a pH range of from about 2 to about 13, and upon exposure to alcohols and sodium hypochlorite bleach, i.e. the colorfastness to crocking will remain above three when tested according to the method used herein.

The inventors have also surprisingly found that materials printed with this composition can result in imparting limited launderability to a fabric which previously was too weak to withstand such a procedure. The inventors believe, though they do not wish to be bound by this belief, that the cured printing composition acts to hold the substrate together and lend it greater integrity. As such they believe that at least about 12 percent print coverage would be required for this launderability effect. The inventors have washed typical Hydroknit® material in a home washer and dryer using twice the normally recommended amount of sodium hypochlorite bleach and after three such washing, rinsings and dryings have found almost no trace of breakdown of the fabric. Similar unprinted material began to breakdown after just one such wash. Based on this test, the inventors believe that a Hydroknit® (pulp and spunbond fabric printed with at least about 12 percent print coverage, will withstand at least 5 launderings under normal wash conditions before it becomes unusable.

While food service wipers have been the focus of this invention thus far, the 20 invention is suitable for printing onto virtually any substrate to which the latex composition will adhere. Further, applications beyond food service wipers include printing onto personal care items such as diapers and incontinence items, infection control products such as surgical gowns and wipers and sterilization wraps, outdoor materials such as protective covers, fabrics for marine applications and wet wipes for personal care or other fluid delivery needs. Those skilled in the art will recognize that numerous variations, modifications and changes of the invention may be practiced without departing from the spirit and scope of the invention as expressed in the following claims.

What is claimed is:

1. A printed substrate formed by the process comprising:
    forming a printing composition comprising an aqueous mixture having a pre-cure pH adjusted to above 8 using a fugitive alkali, a room temperature crosslinkable latex polymer, a pigment, and a cure promoter;
    applying said printing composition to a substrate wherein said substrate comprises a nonwoven web of thermoplastic polyolefin polymer fibers; and
    lowering the pH of said printing composition wherein crosslinking occurs forming said printing and wherein said printing adheres to said nonwoven web substrate and retains a colorfastness above 3 when measured by AATCC test method 8 using 30 strokes when exposed to liquids with a pH between about 2 and about 13.

2. The printed substrate of claim 1 wherein said printing composition when dried retains a colorfastness above 3 when exposed to sodium hypochlorite.

3. The printed substrate of claim 1 wherein said printing composition when dried retains a colorfastness above 3 when exposed to alcohol.

4. The printed substrate of claim 1 wherein said printing composition, based on about 100 dry parts by weight of latex, also comprises between about 0.5 and 33 dry parts by weight of pigment, and between about 1 and 10 dry parts by weight of cure promoter.

5. The printed substrate of claim 1 wherein said printing composition, based on about 100 dry parts by weight of latex, also comprises between about 1 and 5 dry parts by weight of pigment, and between about 4 and 6 dry parts by weight of cure promoter.

6. The printed substrate of claim 4 wherein said printing composition has been cured by driving off said fugitive alkali at a temperature below the melting temperature of said thermoplastic polyolefin polymer fibers.

7. The printed substrate of claim 6 wherein said cure promoter is an aziridine oligimer with at least two aziriding functional groups.

8. The printed substrate of claim 7 wherein said substrate is a nonwoven laminate having a spunbond fiber web as an outer surface.

9. The printed substrate of claim 7 wherein said substrate is a composite fabric of hydroentangled pulp and spunbond fibers which has a pre-printing bone-dry basis weight of from about 49 to about 103 gsm.

10. The printed substrate of claim 1 wherein said substrate is selected from the group consisting of composite fabrics of hydroentangled pulp and spunbond fibers, spunbond fabrics, meltblown fabrics and laminates of spunbond and meltblown fabrics.

11. The printed substrate of claim 10 wherein lowering said pH comprises driving off said fugitive alkali.

12. The printed substrate of claim 10 wherein said crosslinkable latex polymer comprises a polymer selected from the group consisting of ethylene vinyl acetates, ethylene vinyl chlorides, styrene-butadiene, acrylates and styrene-acrylate copolymers.

13. The printed substrate of claim 11 wherein said printing composition is applied by a method selected from the group consisting of gravure printing, flexographic printing and ink-jet printing.

14. A printed substrate comprising a nonwoven web substrate selected from the group consisting of composite fabrics of hydroentangled pulp and spunbond fibers, spunbond fabrics, meltblown fabrics and laminates of spunbond and meltblown fabrics and wherein at least a portion of said nonwoven web substrate comprises thermoplastic polyolefin fibers and having adhered thereon the dried residue of an aqueous mixture comprising a room temperature crosslinkable latex polymer selected from the group consisting of ethylene, vinyl acetates, ethylene vinyl chlorides, styrene-butadiene, acrylates, and styrene-acrylate copolymers, a pigment, and a cure promoter, and which retains a colorfastness above 3 when measured by AATCC test method 8 using 30 strokes when exposed to liquids with a pH between about 2 and about 13.

15. The printed substrate of claim 14 wherein said substrate is a composite fabric of hydroentangled pulp and spunbond fibers having a pre-printing bone-dry basis weight of from about 64 to about 96 gsm and said aqueous mixture comprises about 100 dry parts by weight of said latex, between about 0.5 and 33 dry parts by weight of pigment, and between about 1 and 10 dry parts by weight of cure promoter.

16. A personal care product comprising the substrate of claim 14.

17. A food service wipe comprising the substrate of claim 14.

18. A surgical gown comprising the substrate of claim 14.

19. A sterilization wrap comprising the substrate of claim 14.

20. A fluid delivery wipe comprising the substrate of claim 14.

21. A towel comprising the substrate of claim 14.

22. The substrate of claim 14 wherein said substrate, printed with at least about 12 percent coverage may be laundered and reused at least 5 times.

23. An infection control product comprising the substrate of claim 14.

24. A printed composite fabric of hydroentangled pulp and thermoplastic polyolefin polymer spunbond fibers having a pre-printing bone-dry basis weight of about 64 gsm and having adhered thereon the dried residue of an aqueous mixture comprising about 100 dry parts by weight of a room temperature curable crosslinkable latex selected from the group consisting of ethylene, vinyl acetates, ethylene vinyl chlorides, styrene-butadiene, acrylates, and styrene-acrylate copolymers, between about 1 and 5 dry parts by weight of a pigment, and between about 4 and 6 dry parts by weight of a cure promoter which is an aziridine oligimer with at least two aziridine functional groups, and which retains a colorfastness above 3 when measured by AATCC test method 8 using 30 strokes when exposed to liquids with a pH between about 2 and about 13.

\* \* \* \* \*

UNITED STATES PATENT AND TRADEMARK OFFICE

CERTIFICATION OF CORRECTION

PATENT NO. : 5,853,859

DATED : December 29, 1998

INVENTOR(S): Ruth Lisa Levy; Robert Emil Weber

It is certified that error appears in the above-identified patent and that said Letters Patent is hereby corrected as shown below:

Column 5, Line 18, "Drive., Chicago," should read -- Device Company --;

Column 8, Line 40 "Bridgewater" should read -- E-646 from National Starch & Chemical Co. of Bridgewater --;

Column 9, Line 48, "(RM-8" should read -- RM-8 --;

Column 11, Line 53, "(pulp" should read -- pulp --.

Column 11, Line 58, "20 inventions" should read -- invention --.

Signed and Sealed this

Thirtieth Day of May, 2000

Attest:

Q. TODD DICKINSON

*Attesting Officer*          *Director of Patents and Trademarks*